United States Patent [19]

Imanishi

[11] Patent Number: 4,958,382
[45] Date of Patent: Sep. 18, 1990

[54] RADIO TRANSCEIVER APPARATUS FOR CHANGING OVER BETWEEN ANTENNAS

[75] Inventor: Yasuhito Imanishi, Hyogo, Japan

[73] Assignee: Mitsubishi Denki Kabushiki Kaisha, Hyogo, Japan

[21] Appl. No.: 317,520

[22] Filed: Mar. 1, 1989

[30] Foreign Application Priority Data

Jun. 17, 1988 [JP] Japan .................................. 63-148372

[51] Int. Cl.⁵ .............................................. H04B 7/08
[52] U.S. Cl. ..................................... 455/277; 343/702
[58] Field of Search ................ 455/272, 277; 343/702, 343/876, 777

[56] References Cited

U.S. PATENT DOCUMENTS

4,109,251  8/1978  MacDougall ....................... 343/715

Primary Examiner—Reinhard J. Eisenzopf
Assistant Examiner—Edward Urban

[57] ABSTRACT

A radio frequency transceiver apparatus for changing over between a whip antenna and an internal antenna, wherein the whip antenna itself is utilized as both an antenna change-over element and an antenna change-over line, thereby permitting the antenna change-over in a simple construction and permitting the reduction of insertion loss, with little deterioration of VSWR.

22 Claims, 5 Drawing Sheets

RADIO TRANSCEIVER APPARATUS FOR CHANGING OVER BETWEEN ANTENNAS

BACKGROUND OF THE INVENTION

1. Field of the Invention

The present invention relates to a radio frequency transceiver apparatus for performing a change-over between a whip antenna (movable antenna) and a built-in antenna (internal antenna) in a portable communication device used in a moving body such as an automobile.

2. Description of the Prior Art

Figure 1:
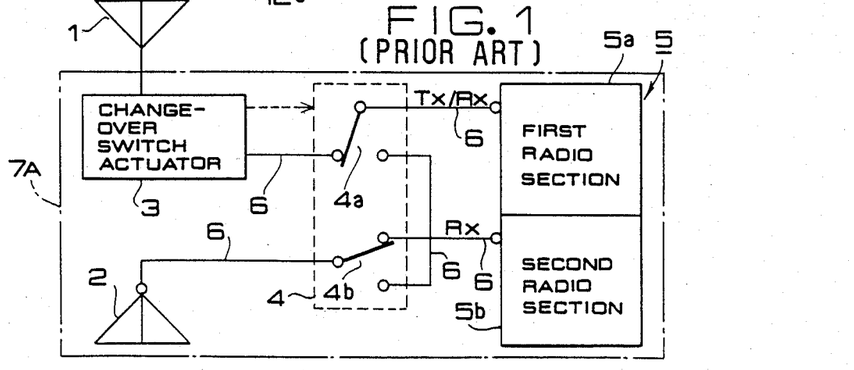
FIG. 1 is a block diagram showing a circuit configuration of a conventional radio frequency transceiver apparatus.

In FIG. 1, which is a block diagram showing a conventional radio frequency transceiver apparatus, the numeral 1 denotes an extensible/retractable whip antenna; numeral 2 denotes a built-in antenna; numeral 3 denotes a change-over switch actuator which operates according to the retraction and extension of the whip antenna 1; numeral 4 denotes a double-throw change-over switch which is actuated for change-over operation by the change-over switch actuator 3; and numeral 5 denotes a radio section composed of first and second radio sections 5a, 5b which are each brought into connection with either the whip antenna 1 or the built-in antenna 2 through the double-throw change-over switch 4 and feeders 6 serving as coupling means.

The first radio section 5a constitutes a first configuration of the transceiver means for processing RF (radio frequency) signals of a low level, while the second radio section 5b constitutes a second configuration of the transceiver means for processing RF signals of a high level relative to the low level.

When the whip antenna 1 is extended, the whip antenna and the first radio section 5a are connected and the built-in antenna 2 and the second radio section 5b connected. On the other hand, when the whip antenna 1 is retracted, it is disconnected from the first radio section 5a and the built-in antenna 2 is disconnected from the second radio section 5b and connected to the first radio section 5a.

Numeral 7A denotes a housing which houses therein the whip antenna 1, built-in antenna 2, change-over switch actuator 3, double-throw change-over switch 4 and radio section 5. The housing 7A can be mounted in a moving body such as an automobile.

The operation of such conventional radio frequency transceiver apparatus will now be described. When the whip antenna 1 is extended, the double-throw change-over switch 4 is switched from the built-in antenna 2 side to the whip antenna 1 side by the change-over switch actuator 3, so that the whip antenna 1 and the first radio section 5a are connected and the built-in antenna 2 and the second radio section 5b connected through feeders 6.

On the other hand, when the whip antenna 1 is retracted, the double-throw change-over switch 4 is switched from the whip antenna 1 side to the built-in antenna 2 side by the change-over switch actuator 3, so that the built-in antenna 2 and the first radio section 5a are connected through feeders 6. At this time, the second radio section 5b is disconnected from both antennas.

The change-over switch actuator 3 operates mechanically according to extension and retraction of the whip antenna. A contact piece (not shown) thereof actuates a change-over lever of the double-throw change-over switch 4 to change over the same switch.

A transmitter and a receiver are incorporated in the first radio section 5a, while a receiver is incorporated in the radio section 5b. When the reception level is low, there is performed diversity reception wherein the whip antenna 1 is extended and used for both transmission and reception, while the built-in antenna 2 is used for reception only. On the other hand, when the reception level is high, the whip antenna 1 is retracted and only the built-in antenna 2 is used for transmission and reception.

Since the conventional radio frequency transceiver apparatus is constructed as above, the whip antenna 1 when retracted is disconnected from all the circuits and so it does not function as antenna at all. Moreover, for change-over between the whip antenna 1 and the built-in antenna 2 it is necessary to use the change-over switch actuator 3 in addition to the double-throw change-over 4. This structure results in an increase in the number of components causes problems such as insertion loss and deterioration of VSWR (voltage standing wave ratio).

A closely similar art to the above prior art, reference is here made to a portable radio device invented by Mr. Tamura, filed with the Japanese Patent Office by Nippon Electric Company, Limited on Aug. 30, 1986 and laid open as Japanese Patent Laid-Open No. 60628/88 on Mar. 16, 1988.

SUMMARY OF THE INVENTION

It is an object of the present invention to provide a radio frequency transceiver apparatus employable as a line element even when a whip antenna is in a retracted state.

It is another object of the present invention to provide a radio frequency transceiver apparatus free of insertion loss or VSWR deterioration, superior in performance and inexpensive as a portable communication device, which apparatus utilizes the above whip antenna in a retracted state as both an antenna change-over element and an antenna change-over line, thereby permitting change-over between the whip antenna, built-in antenna and the first, second radio sections in a simple construction without using a special change-over switch or change-over switch actuator.

In order to achieve the above-mentioned objects, a radio frequency transceiver apparatus according to the present invention includes a housing for containing the components of the apparatus; a whip antenna capable of moving between an extended position spaced from the housing and a retracted position adjacent to the housing; an internal antenna disposed within the housing; change-over means for connecting the whip antenna and the internal antenna selectively to first and second transceiver means in response to movement of the whip antenna; and coupling means for forming a low loss RF signal path from the whip antenna and internal antenna to both transceiver means, the whip antenna itself serving as both part of an antenna change-over line and an antenna change-over element to reduce insertion loss and VSWR deterioration.

Further, support means for supporting and guiding the whip antenna during movement between the extended and retracted positions is electrically connected to the internal antenna disposed in the housing to thereby smooth the movement of the whip antenna.

Further, a radio frequency transceiver apparatus according to the present invention includes a housing for containing the components of the apparatus; a whip antenna capable of moving between an extended position spaced from the housing and a retracted position adjacent to the housing; support means for supporting and guiding the whip antenna during the said movement; contact means formed integrally with both the whip antenna and the antenna support means to connect the whip antenna to an RF signal processing transceiver means in response to the above movement of the whip antenna between the extended and retracted positions of the same antenna; and coupling means for connecting the antenna support means directly to the transceiver means to form a low loss RF signal path from the whip antenna to the transceiver means. By this radio frequency transceiver apparatus there is attained a structural simplification.

DETAILED DESCRIPTION OF THE PREFERRED EMBODIMENTS

The present invention will be described in detail hereinafter with respect to preferred embodiments with reference to the accompanying drawings.

Figure 2:
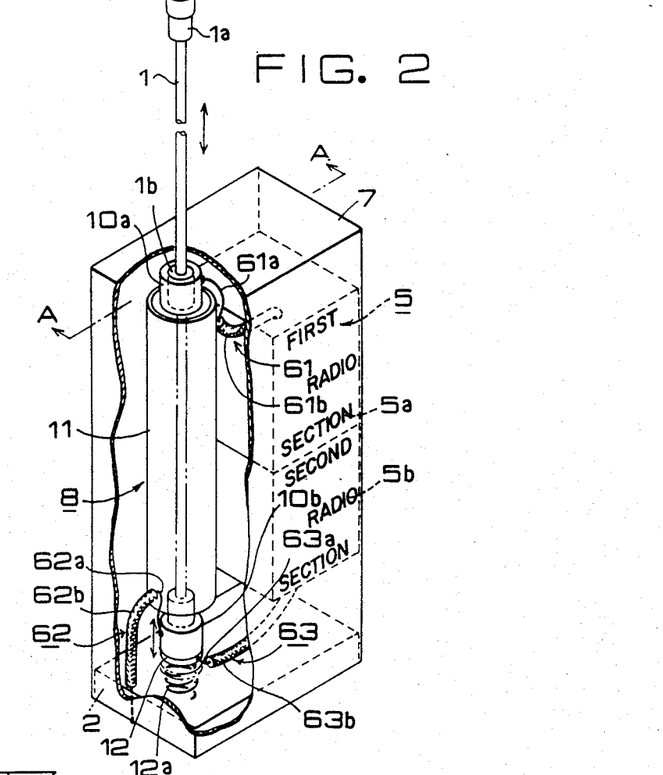
FIG. 2 is a partially cut-away perspective view of a radio frequency transceiver apparatus according to a first embodiment of the present invention.
Figure 3:
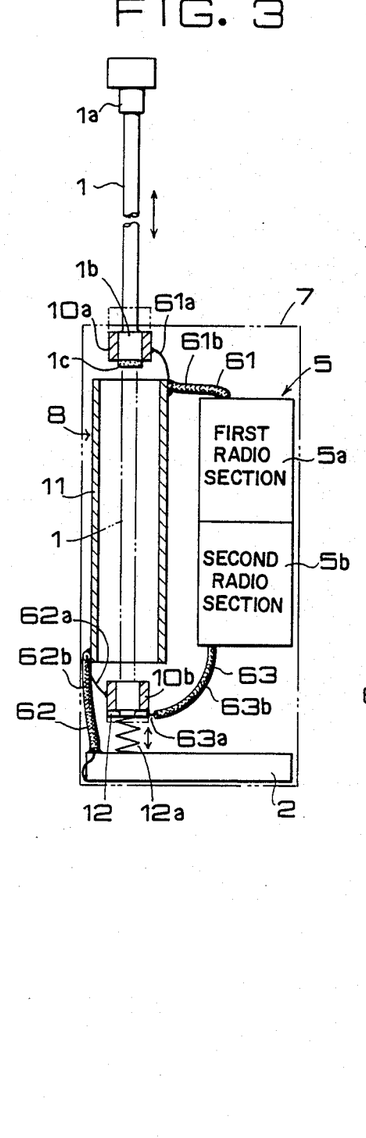
FIG. 3 is a longitudinal sectional view taken along line A—A of/FIG. 2.

In FIGS. 2 and 3, the reference numeral 1 denotes an extensible/retractable whip antenna having first and second movable contacts 1a, 1b at both ends thereof. Numeral 2 denotes a built-in or internal antenna (a plate-like, inverted F type antenna in the illustrated embodiment); numeral 5 denotes a radio section consisting of first and second radio sections 5a, 5b; and numeral 7 denotes a housing for containing the whip antenna 1, internal antenna 2, radio section 5 and a later-described change-over switch 8. These components are the same as or equivalent to those indicated by the same reference numerals in FIG. 1.

The change-over switch 8 just referred to above is constituted by utilizing the whip antenna 1 itself and is provided with first and second fixed metallic contacts 10a, 10b for contact with the upper and lower movable contacts 1a, 1b of the whip antenna 1, a movable metallic contact which is brought into contact with the bottom of the second fixed metallic contact 10b by virtue of a spring 12a, and a cylindrical earthing conductor 11. The first fixed metallic contact 10a positioned on the upper side comes into contact with the whip antenna 1 at the time of extension and retraction of the same antenna, while the second fixed metallic contact 10b comes into contact with the whip antenna 1 only when the whip antenna is retracted. Core conductors 61a, 62a and 63a of first, second and third coaxial feeders 61, 62 and 63 are used to connect between the first fixed metallic contact 10a and the first radio section 5a, between the second fixed metallic contact 10b and the internal antenna 2, and between the movable metallic contact 12 and the second radio section 5b, respectively. On the other hand, to the upper and lower portions of the earthing conductor 11 are connected, for earth, outer conductors 61b and 62b, respectively, of the first and second coaxial feeders 61, 62 which are connected respectively to the radio section 5a and the internal antenna 2. When the whip antenna 1 is extended, the lower portion of the same antenna comes into contact with only the upper, first fixed metallic contact 10a, while the movable metallic contact 12 is pushed up into contact with the bottom of the lower, second fixed metallic contact 10b by means of the spring 12a attached to the contact 12. On the other hand, at the time of retraction of the whip antenna 1, the whip antenna is retracted into the earthing conductor 11 along the axis thereof and the upper and lower portions thereof come into contact with the first and second fixed metallic contacts 10a, 10b, respectively, and push down the movable metallic contact 12. In this connection, an insulator 1c is attached to the base end portion of the whip antenna 1 which portion comes into contact with the movable metallic contact 12, thereby preventing electrical connection with the contact 12. Thus, the whip antenna 1 when retracted constitutes a core conductor of a coaxial line which serves as a transmission line, while the cylindrical earthing conductor 11 constitutes an outer conductor of the said coaxial line, whereby the internal antenna 2 is disconnected from the second radio section 5b and at the same time it is changed over to the first radio section 5a.

The operation of the apparatus of this embodiment will now be described. When the whip antenna 1 is extended (as indicated by a solid line in FIG. 2), the movable contact 1b at the lower portion of the whip antenna 1 comes into contact with the first fixed metallic contact 10a, so that the whip antenna 1 and the first radio section 5a are interconnected through the contact 10a and the first coaxial feeder 61. At this time, the internal antenna 2 is disconnected from the first radio section 5a and at the same time the movable metallic contact 12 which has been pushed down by the whip antenna 1 is forced up by virtue of the spring 12a attached thereto and comes into contact with the bottom of the second fixed metallic contact 10b, whereby the internal antenna 1 is changed over to the second radio section 5b.

On the other hand, when the whip antenna 1 is retracted, it passes through the first fixed metallic contact 10a and is inserted into the cylindrical earthing conductor 11 downwards along the axis of the earthing conductor. In this state, as indicated by a chain line in FIG. 3, the upper and lower movable contacts 1a, 1b are in contact with the first and second fixed metallic contacts 10a, 10b, respectively. At this time, the whip antenna 1 and the earthing conductor 11 are completely separated from each other; the earthing conductor 11 serves as an outer conductor which connects between the outer conductors 62b and 61b of the second and first coaxial feeders 62, 61 on the internal antenna 2 and first radio section 5a sides, respectively, while the whip antenna 1 serves as a core conductor which connects between the core conductors 62a and 61a of the second and first coaxial feeders 62, 61 on the internal antenna 2 and first radio section 5a sides, respectively. The whip antenna 1 and the earthing conductor 11 constitute a coaxial line and at the same time function as the change-over switch 8. Thus, the retraction of the whip antenna 1 brings about the same result as the change-over switch 8 having been changed over from the whip antenna 1 side to the internal antenna 2 side, whereby the internal antenna 2 and the first radio section 5a are connected through the second and first coaxial feeders 62, 61. At the same time, as another function of the change-over switch 8, the electrically insulated bottom of the whip antenna 1 pushes down the movable metallic contact 12 to disconnect the internal antenna 2 which has been connected through the third coaxial feeder 63 from the second radio section 5b.

By selecting an appropriate size of the core conductor which the inserted whip antenna 1 itself constitutes, that of the earthing conductor 11 and that of the movable metallic contact 12, the change-over switch 8 utilizing the whip antenna 1 can be matched in impedance with the first and second coaxial feeders 61, 62, whereby it is possible to constitute a highly efficient transmission line with reduced insertion loss and improved VSWR.

Thus, according to the apparatus of this embodiment, when the whip antenna 1 is retracted, the whip antenna itself is used as part of the transmission line and not only the internal antenna 2 and the first radio section 5a are interconnected through the whip antenna 1, but also the insulating plate attached to the bottom of the whip antenna 1 pushes down the movable metallic contact 12 as the connection between the second radio section 5b and the internal antenna 2 to disconnect the connection from the internal antenna. Thus, the whip antenna 1 itself functions as the double-throw change-over switch 8, dispensing with additional change-over switch and change-over switch actuator (see the portions indicated by the reference numerals 4 and 3, respectively, in FIG. 1). In such a simple construction there is effected change-over between the whip antenna 1 and the internal antenna 2. Consequently, insertion loss and deterioration of VSWR are reduced, the performance of the housing 7 is greatly improved, and it becomes possible to obtain a less expensive apparatus.

Figure 4:
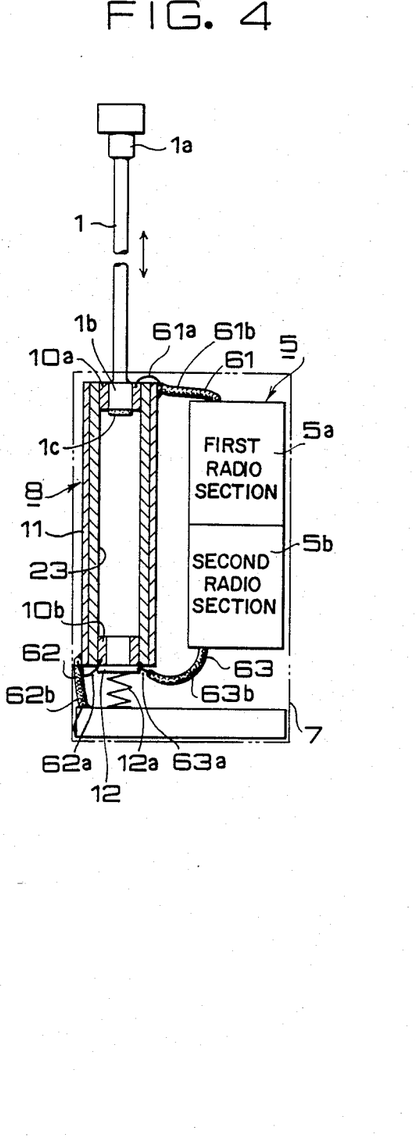
FIG. 4 is a longitudinal sectional view of a principal portion of a radio frequency transceiver apparatus according to a second embodiment of the present invention, with a whip antenna being in an extended state.
Figures 5, 6, 7:
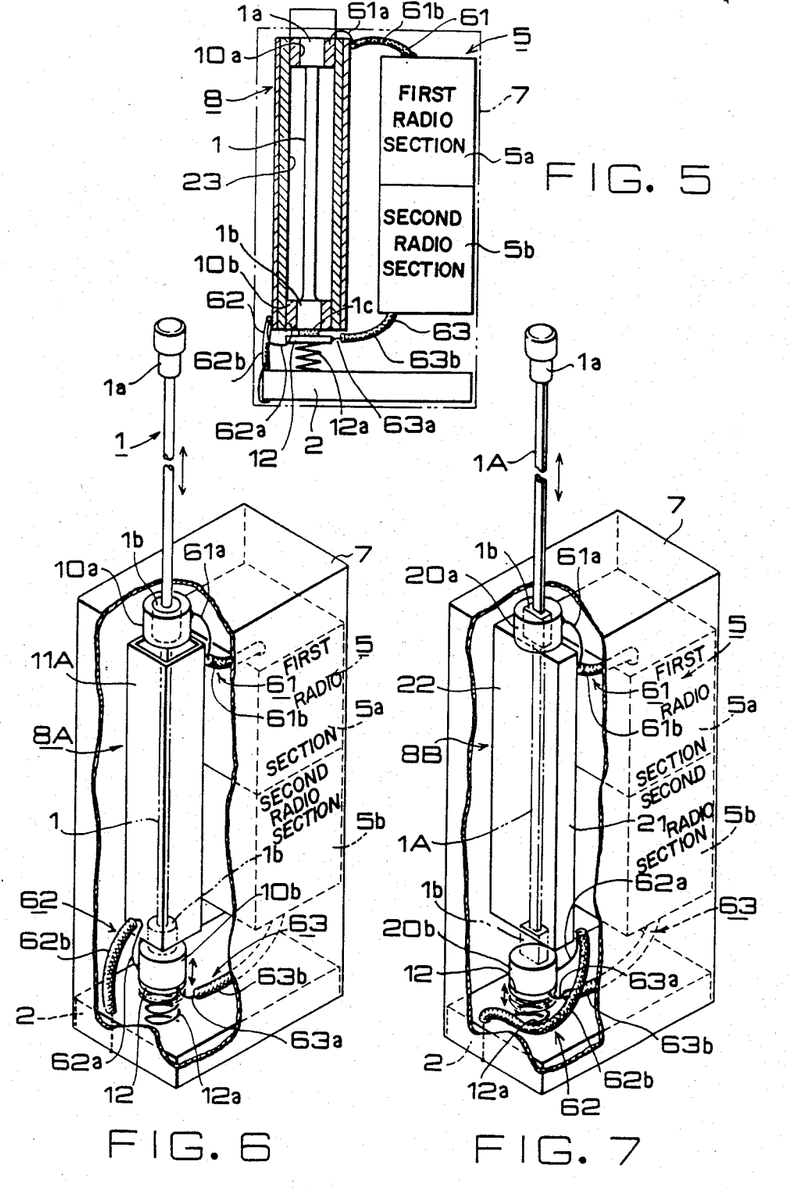
FIG. 5 is a longitudinal sectional view of the principal portion, with the whip antenna being in a retracted state, in FIG. 4.
FIG. 6 is a partially cut-away perspective view of a radio frequency transceiver apparatus according to a third embodiment of the present invention.
FIG. 7 is a partially cut-away perspective view of a radio frequency transceiver apparatus according to a fourth embodiment of the present invention.

Although in the above embodiment the first and second fixed metallic contacts 10a and 10b are formed separately from the cylindrical earthing conductor 11, an insulating layer 23 may be formed on the inner surface of the conductor 11, and the first and second fixed metallic contacts 10, 10b may be fixed to the inner surface portions of both ends of the earthing conductor 11. Also in this case there will be attained the same effect as in the above embodiment.

Although the earthing conductor 11 used in the preceding embodiments is cylindrical, there may be used a prismatic earthing conductor 11A having a square section to constitute a change-over switch 8A, as shown in FIG. 6. Also in this case there will be attained the same effect as in the preceding embodiments.

Further, although in the preceding embodiments a coaxial line is used as the transmission line of the change-over switch 8 or 8A which utilizes the whip antenna 1, there may be used a strip line to constitute a change-over switch 8B, as shown in FIG. 7. In this case, a plate-like whip antenna 1A is used in place of the rod-like whip antenna. In FIG. 7, the change-over switch 8B, which is constituted by utilizing the whip antenna 1A itself, includes a pair of first and second fixed metallic contacts 20a, 20b disposed up and down, respectively, a plate-like earthing conductor 21 and a dielectric plate 22. The first and second fixed metallic contacts 20a, 20b fulfil the same function as the foregoing first and second fixed metallic contacts 10a, 10b. The dielectric plate 22 is centrally formed with a slot for passing therethrough of the whip antenna 1A, and the whip antenna 1A is covered with a suitable dielectric film except its both end portions where its metal is exposed. When the whip antenna 1A is retracted, therefore, a strip line is constituted by suitably setting the dielectric constant and thickness of the film as well as the spacing from the earthing conductor 21, whereby there can be attained impedance matching with the first and second coaxial feeders 61, 62 and it is possible to constitute a highly efficient transmission line with reduced insertion loss and improved VSWR. Thus, the same effect as in the preceding embodiments can be attained.

In the strip line, the earthing conductor 21 may be provided on both sides in a sandwiching relation to the dielectric plate 22.

Further, the movable metallic contact 12, which is pushed by virtue of the whip antenna 1 or 1A, may be forced back using a plate spring or magnet in place of the coil spring used in the illustrated embodiments.

Although in the preceding embodiments an insulator is attached to the underside of the whip antennas 1 and 1A, it may be provided on the central portion of the upper surface of the movable metallic contact 12.

Figure 8:
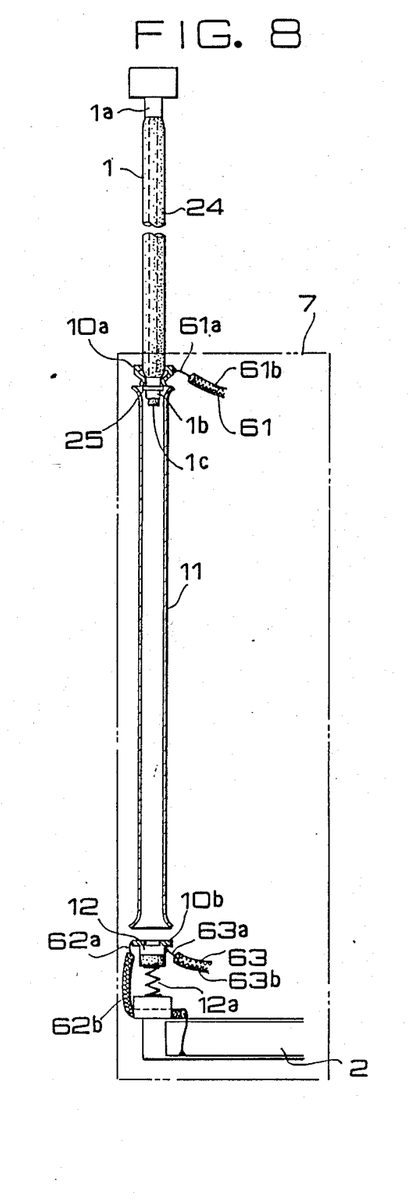
FIG. 8 is a longitudinal sectional view of a principal portion of a radio frequency transceiver apparatus according to a fifth embodiment of the present invention, with a whip antenna being in an extended state.
Figure 9:
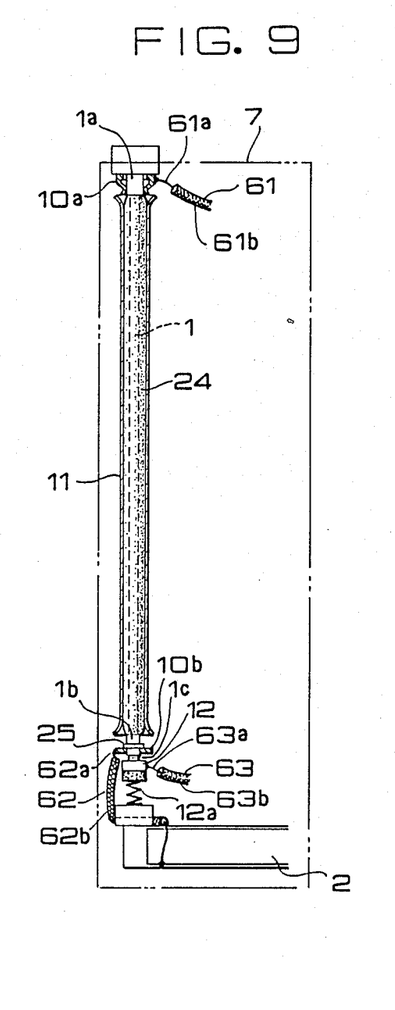
FIG. 9 is a longitudinal sectional view of the principal portion, with the whip antenna being in a retracted state, in FIG. 8.

Referring now to FIGS. 8 and 9, there is illustrated a fifth embodiment of the present invention, wherein the body portion of a whip antenna 1 is covered with a sheath 24 formed of an insulating material so that the outside diameter of the sheath 24 is equal to the inside diameter of the earthing conductor 11, the sheath 24 being utilized as support means for supporting and guiding the whip antenna during movement of the antenna, thereby permitting smooth movement of the same antenna.

The numeral 25 in FIGS. 8 and 9 denotes a stopper provided at the lower portion of the whip antenna 1. As shown in FIG. 8, when the whip antenna 1 is extended, the stopper 25 comes into contact with the lower end of a first fixed metallic contact 10a to restrict the extended position of the whip antenna 1.

Figure 10:
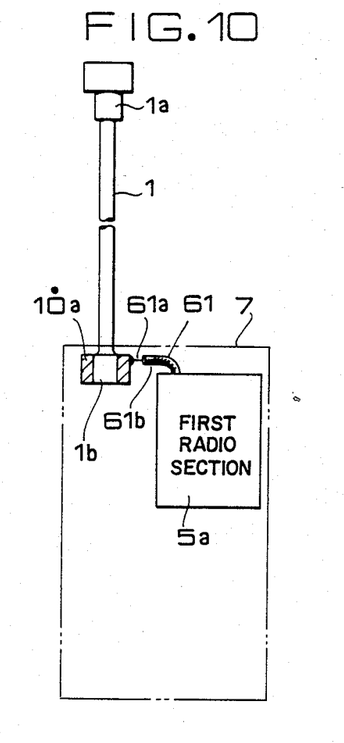
FIG. 10 is a longitudinal sectional view of a principal portion of a radio frequency transceiver apparatus according to a sixth embodiment of the present invention, with a whip antenna being in an extended state.
Figure 11:
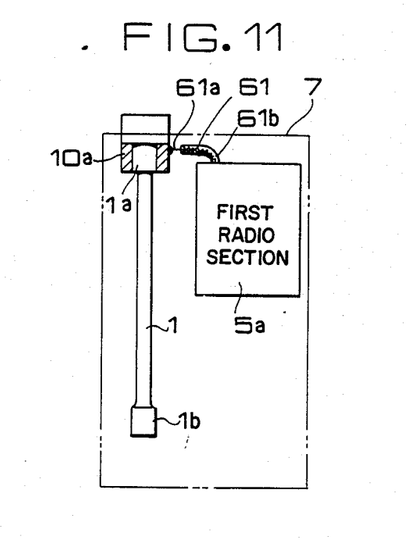
FIG. 11 is a longitudinal sectional view of the principal portion, with the whip antenna being in a retracted state, in FIG. 10.

Referring now to FIGS. 10 and 11, there is illustrated a sixth embodiment of the present invention, which uses only a whip antenna 1 and a first radio section 5a, thus providing a simple antenna change-over structure.

Under this construction, when the whip antenna 1 is pulled out into an extended position as shown in FIG. 10, a movable contact provided at the lower end of the whip antenna comes into contact with a fixed metallic contact 10a and this thereby connected to the first radio section 5a through a core conductor 61a of a coaxial feeder 61 as coupling means, now ready for transmission and reception in high sensitivity.

On the other hand, when the whip antenna 1 is pushed back to a retracted position thereof as shown in FIG. 11, a movable contact provided at the upper end of the whip antenna comes into contact with the fixed metallic contact 10a and is thereby connected to the first radio section 5a through the same path as mentioned above, now ready for transmission and reception in suppressed sensitivity.

In this case, the transmission power may be changed between that applied at the time of extension of the whip antenna 1 and that at the time of retraction thereof, whereby the power consumption can be reduced.

Further, in order to stabilize the characteristics of the whip antenna 1 when retracted, the whip antenna is disposed at a corner of the housing 7 close to the exterior.

Figure 12:
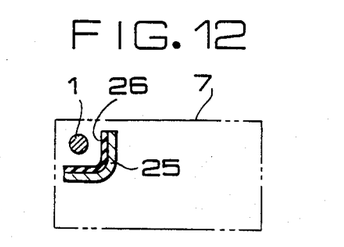
FIG. 12 is a plan view of a principal portion of a radio frequency transceiver apparatus according to a seventh embodiment of the present invention.

As shown in FIG. 12, moreover, an earth plate 25 is disposed near the whip antenna 1 to stabilize the earth current flowing route. Further, a high dielectric material 26, e.g. ceramic material, is disposed on the surface of the earth plate 25 which surface is opposed to the whip antenna 1 to control the earth plate current effectively, thereby controlling the earth current flowing route and attaining the improvement of efficiency.

The whip antenna 1 used in this embodiment may be either of coaxial and strip types, and it is preferable that its body portion be covered with sheath of an insulating material to prevent the occurrence of trouble in the event the whip antenna 1 should bend during movement.

What is claimed is:

1. A radio frequency transceiver apparatus comprising:

a housing for containing the components of the apparatus;

a movable antenna having a body portion and a first distal end movable between an extended position spaced from said housing and a retracted position adjacent said housing, said movable antenna having a second distal end movable within said housing;

an internal antenna disposed within said housing;

transceiver means having a first configuration for processing low level RF signals and a second configuration for processing RF signals of a high level relative to said low level;

switch means having portions integral with the body portion of said movable antenna for selectively interconnecting said movable antenna and internal antenna to said first and second configurations of the transceiver means in response to movement of said movable antenna between said extended and retracted positions;

coupling means for directly connecting said body portion of the movable antenna to said transceiver means to provide a low loss RF signal path from said movable and internal antennas to said transceiver means; and said switch means including first and second fixed electrical contacts for operative connection to first and second spaced movable contacts provided on said movable antenna, said first and second fixed contacts being connected to said coupling means, said second movable contact being connected to said first fixed contact when said movable antenna is in said extended position and said first and second movable contacts being connected to said first and second contacts, respectively, in said retracted position, a third movable contact supported by said housing for coupling said internal antenna to said second fixed contact when said movable antenna is in said extended position and separating said internal antenna from said second fixed contact when the movable antenna is in said retracted position.

2. A radio frequency transceiver apparatus as claimed in claim 1 further including means for normally biasing said third movable contact into engagement with said second fixed contact, and pusher means on said distal end of said movable antenna for pushing said third movable contact away from said second fixed contact when said movable antenna is in said retracted position.

3. A radio frequency transceiver apparatus as claimed in claim 1 wherein said means for biasing is a spring and said pusher means includes an insulated portion of said second distal end.

4. A radio frequency transceiver apparatus as claimed in claim 1 wherein the first configuration of said transceiver means includes a transmitter, a first receiver and a second receiver for processing RF signals, and said second configuration includes only said transmitter and first receiver.

5. A radio frequency transceiver apparatus as claimed in claim 4 wherein the first configuration of said transceiver means is selectively interconnected to both antennas in the extended position of said movable antenna, said movable antenna being operatively interconnected to said transmitter and said first receiver and the internal antenna being operatively interconnected to said second receiver; and the second configuration of said transceiver means is selectively interconnected to the internal antenna in the retracted position of said movable antenna, said internal antenna being operatively interconnected to said transmitter and first receiver and disconnected from said second receiver.

6. A radio frequency transceiver apparatus as claimed in claim 1 further including elongated electrode means surrounding said body of said movable antenna when the movable antenna is in the retracted position, said elongated electrode means being electrically grounded and forming a coaxial transmission line with the body of the movable antenna for transmitting RF signals between said first and second fixed contacts from said internal antenna.

7. A radio frequency transceiver apparatus as claimed in claim 6 wherein the body of the movable antenna is a cylindrical rod and said elongated electrode means is a cylinder surrounding said rod.

8. A radio frequency transceiver apparatus as claimed in claim 6 wherein the body of the movable antenna is a cylindrical rod and said elongated electrode means is tubular with a rectangular cross section.

9. A radio frequency transceiver apparatus as claimed in claim 6 wherein the body of the movable antenna is a rod with a rectangular cross section and said elongated electrode means is tubular with a rectangular cross section.

10. A radio frequency transceiver apparatus as claimed in claim 6 wherein said elongated electrode means has a length selected to create an impedance match with said coupling means.

11. A radio frequency "(RF)" transceiver apparatus comprising:
   a housing for containing the components of the apparatus;
   a movable antenna having a body portion and a first distal end movable between an extended position spaced from said housing and a retracted position adjacent said housing, said movable antenna having a second distal end movable within said housing;
   support means for supporting and guiding said movable antenna during movement between the extended and retracted positions;
   an internal antenna disposed within said housing and electrically coupled to said support means;
   transceiver means having a first configuration for processing low level RF signals and a second configuration for processing RF signals of a high level relative to said low level;
   connecting means integral with said movable antenna and antenna support means for selectively interconnecting said movable antenna and internal antenna to said first and second transceiver configuration in response to movement of said movable antenna between said extended and retracted positions;;
   coupling means for directly connecting said antenna support means to said transceiver means to provide a low loss RF signal path from said movable and internal antennas to said transceiver means; and
   said connecting means further including first and second fixed electrical contacts for operative connection to said first and second spaced movable contacts provided on said movable antenna, said first and second fixed contacts being connected to said coupling means, said second movable contact being connected to said first fixed contact when said movable antenna is in said extended position and said first and second movable contacts being connected to said first and second fixed contacts, respectively, in said retracted position, a third movable contact supported by said housing for coupling said internal antenna to said second fixed contact when said movable antenna is in said extended position and separating said internal antenna from said fixed contact when the movable antenna is in said retracted position.

12. A radio frequency transceiver apparatus as claimed in claim 11 further including means for normally biasing said third movable contact into engagement with said second fixed contact, and pusher means on said second distal end of said movable antenna for pushing said third movable contact away from said second fixed contact when said movable antenna is in said retracted position.

13. A radio frequency transceiver apparatus as claimed in claim 12, wherein said means for biasing is a spring and said pusher means includes an insulated portion of said second distal end.

14. A radio frequency transceiver apparatus as claimed in claim 11 wherein the first configuration of said transceiver means includes a transmitter, a first receiver and a second receiver for processing RF signals, and said second configuration includes said transmitter and first receiver.

15. A radio frequency transceiver apparatus as claimed in claim 14 wherein the first configuration of said transceiver means is selectively interconnected to both antennas in the extended position of said movable antenna, said movable antenna being operatively interconnected to said transmitter and said first receiver and the internal antenna being operatively interconnected to said second receiver; and the second configuration of said transceiver means is selectively interconnected to the internal antenna in the retracted position of said movable antenna, said internal antenna being operatively interconnected to said transmitter and first receiver and disconnected from said second receiver.

16. A radio frequency transceiver apparatus as claimed in claim 11 further including elongated electrode means surrounding said body portion of said movable antenna when the movable antenna is in the retracted position, said elongated electrode means being electrically grounded and forming a coaxial transmission line with the body of the movable antenna for transmitting RF signals between said first and second fixed contacts from said internal antenna.

17. A radio frequency transceiver apparatus as claimed in claim 16 wherein the body portion of the movable antenna is a cylindrical rod and said elongated electrode means is a cylinder surrounding said rod.

18. A radio frequency transceiver apparatus as claimed in claim 16 wherein the body portion of the movable antenna is a cylindrical rod and said elongated electrode means is tubular with a rectangular cross section.

19. A radio frequency transceiver apparatus as claimed in claim 16 wherein the body portion of the movable antenna is a rod with a rectangular cross section and said elongated electrode means is tubular with a rectangular cross section.

20. A radio frequency transceiver apparatus as claimed in claim 16 wherein said elongated electrode means has a length selected to create an impedance match with said coupling means.

21. A radio frequency transceiver apparatus as claimed in claim 11 wherein the first configuration of said transceiver means includes a transmitter, a first receiver and a second receiver for processing RF signals, and said second configuration includes said transmitter and first receiver.

22. A radio frequency transceiver apparatus as claimed in claim 21 wherein the first configuration of said transceiver means is selectively interconnected to both antennas in the extended position of said movable antenna, said movable antenna being operatively interconnected to said transmitter and said first receiver and the internal antenna being operatively interconnected to said second receiver; and the second configuration of said transceiver means is selectively interconnected to the internal antenna in the retracted position of said movable antenna, said internal antenna being operatively interconnected to said transmitter and first receiver and disconnected from said second receiver.

* * * * *